United States Patent [19]

Ono

[11] Patent Number: 4,652,135

[45] Date of Patent: Mar. 24, 1987

[54] ARTICLE HOLDING APPARATUS AND ITS USE

[75] Inventor: Takatoshi Ono, Nagareyama, Japan

[73] Assignee: Disco Abrasive Systems, Ltd., Tokyo, Japan

[21] Appl. No.: 852,594

[22] Filed: Jul. 3, 1986

Related U.S. Application Data

[63] Continuation of Ser. No. 611,768, May 18, 1984, abandoned.

[30] Foreign Application Priority Data

May 23, 1983 [JP] Japan .................................. 58-78093

[51] Int. Cl.[4] .............................................. G01B 11/00

[52] U.S. Cl. .................................... 356/401; 356/399; 269/21

[58] Field of Search ....................... 269/11, 13, 21, 63; 279/3; 51/235; 356/399, 375, 401; 350/525, 529

[56] References Cited

U.S. PATENT DOCUMENTS 3,752,589 8/1973 Kobayashi .......................... 356/401
3,937,579 2/1976 Schmidt .............................. 356/399
4,040,736 8/1977 Johannsmeier ...................... 356/399
4,326,805 4/1982 Feldman et al. .................... 356/401

*Primary Examiner*—Frederick R. Schmidt
*Assistant Examiner*—Judy J. Hartman
*Attorney, Agent, or Firm*—Beveridge, DeGrandi & Weilacher

[57] ABSTRACT

An article holding apparatus provided with a plate on which an article is placed. A light transmitting opening is formed in the plate. There is provided an optical system optically connected to the light transmitting opening. Reflection light from a part of the undersurface of the article placed on the plate comes into the optical system through the light transmitting opening.

19 Claims, 5 Drawing Figures

ARTICLE HOLDING APPARATUS AND ITS USE

This application is a continuation of application Ser. No. 611,768, filed May 18, 1984, now abandoned the entire disclosure of which is relied upon and incorporated herein by reference.

FIELD OF THE INVENTION

This invention relates to an article holding apparatus provided with a plate to place an article thereon. Such an article holding apparatus can be conveniently used, although not exclusively, as a wafer holding apparatus to place a semiconductor wafer thereon in a wafer mounting machine to mount the semiconductor wafer to a frame by applying tape over both of the semiconductor wafer and the frame.

DESCRIPTION OF THE PRIOR ART

As is well known among those skilled in the art, in semiconductor device manufacturing process, one surface of a semiconductor wafer is defined into a number of rectangular areas by so-called streets arranged in a lattice pattern and a circuit pattern is applied to each of these rectangular areas. Thereafter, the wafer is cut along the aforesaid streets and thus the rectangular areas are separated individually. The separated individual rectangular area is generally called a chip.

Usually, prior to the aforesaid cutting of the wafer, the wafer is mounted to a frame with tape. The frame has an opening a little larger than the wafer in the central portion thereof, the wafer is positioned within the opening, and tape is applied over the opposite surface of the aforesaid one surface having a circuit pattern applied thereto of the wafer and the frame to thus mount the wafer to the frame. At the aforesaid cutting of the wafer, only the wafer is cut without cutting the tape. Therefore, the wafer is separated into a lot of chips but these lot of chips are kept holding with the tape without being scattered.

In the meantime, a wafer mounting machine is utilized for mounting the wafer to the frame with the tape. This wafer mounting machine has a holding apparatus provided with a supporting table and a wafer holding plate mounted on the supporting table. The wafer is placed on the plate facing the aforesaid one surface having a circuit pattern applied thereto with the plate. The frame is placed on the supporting table surrounding the plate and the wafer is thus positioned within the opening formed in the central portion of the frame. Thereafter, the wafer and the frame are covered and applied with the tape.

In the aforesaid wafer mounting operation, it is important to position the wafer at a certain angle position to the frame such that the aforesaid streets existing on the aforesaid one surface of the wafer have a certain relationship with a specific part of the frame, for example one end edge of the frame because, in the aforesaid cutting of the wafer, it is necessary to cut the wafer fully precisely along the streets and at least the primary alignment of the wafer for this purpose is carried out based on the aforesaid specific part of the frame. As is well known among those skilled in the art, a flat portion called an orientation flat is generally formed at a part of the periphery of the wafer and the streets existing on the aforesaid one surface are made to have a certain relationship with the orientation flat. Therefore, the aforesaid positioning of the wafer to the frame has been usually carried out based on the orientation flat.

It is not rare, however, that the streets are not made to have a fully precise certain relationship with the orientation flat. In these instances, it is desired to carry out the aforesaid positioning of the wafer to the frame based directly on the streets not on the orientation flat. As described above, however, since the wafer is placed on the plate facing the one surface having the streets thereon with the plate, it has not been possible to see or detect the streets, and the aforesaid requirement has not been heretofore fulfilled.

SUMMARY OF THE INVENTION

Therefore, it is a primary object of this invention to provide a novel and excellent article holding apparatus which can be conveniently used, although not exclusively, as a wafer holding apparatus especially in a wafer mounting machine and enables to carry out positioning of a wafer to a frame based directly on streets existing on one surface of the wafer.

According to this invention, there is provided an article holding apparatus provided with a plate to place an article thereon wherein a light transmitting opening is formed in said plate, an optical system optically connected to said light transmitting opening is provided, and reflection light from a part of the undersurface of the article placed on said plate comes into said optical system through said light transmitting opening.

Other objects of this invention will become apparent from the following description.

DETAILED DESCRIPTION OF PREFERRED EMBODIMENTS

Figure 1:
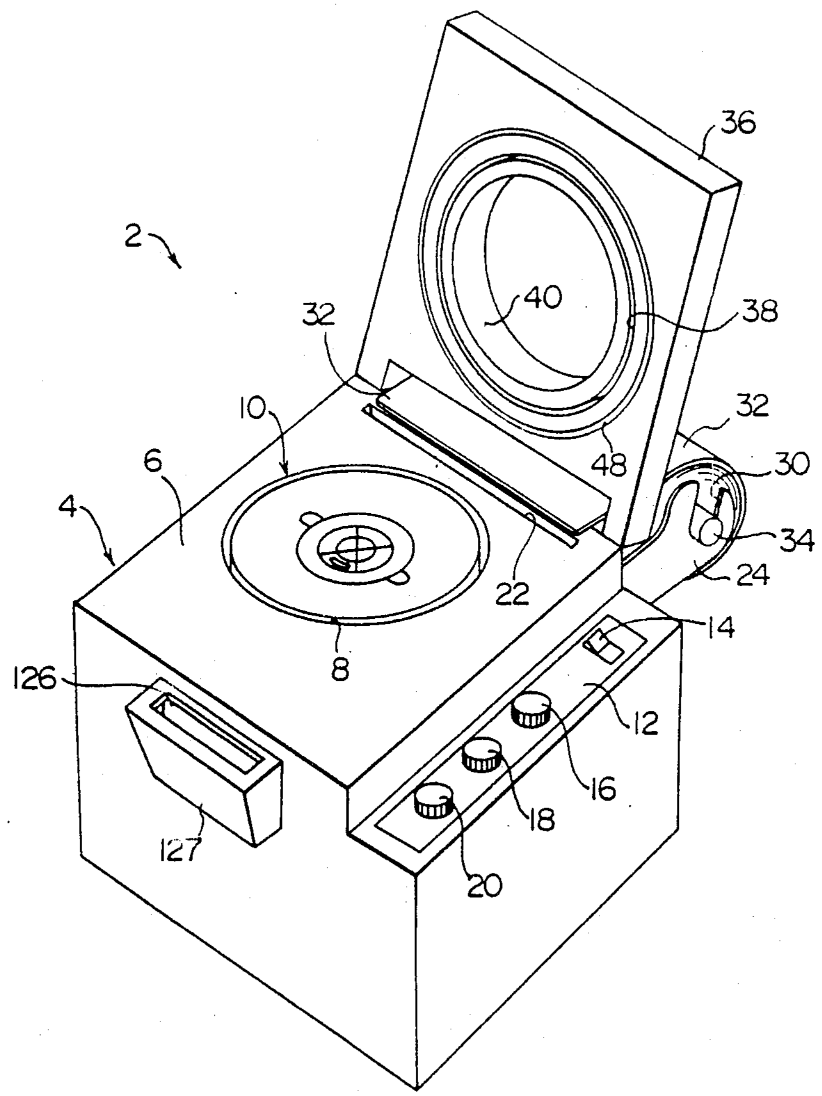
FIG. 1 is a perspective view showing a wafer mounting machine provided with one embodiment of the article holding apparatus constructed in accordance with this invention in the state that its movable frame is in a open position.

FIG. 1 shows an example of a wafer mounting machine provided with one embodiment of the article holding apparatus constructed in accordance with this invention. The wafer mounting machine shown generally at 2 is provided with a box-like housing 4. An opening 8 which may be circular having a relatively large diameter is formed in the central portion of the upper wall 6 of the housing 4. An article holding apparatus 10 is disposed in the housing 4 and the upper surface of this article holding apparatus 10 is exposed through the opening 8. (There will be further explained in detail later about the article holding apparatus 10 itself.) An operation panel 12 is disposed at one side portion of the upper wall 6 and a power switch 14, a first vacuum switch 16, a second vacuum switch 18 and an up-and-down switch 20 are provided on this panel 12. (There will be further referred to these switches 14, 16, 18 and 20 later.) A laterally extending slit 22 is formed in the rear end portion of the upper wall 6. The housing 4 has a pair of protruding pieces 24 and 26 (refer to FIG. 2 as well) protruding backwardly beyond the rear end wall thereof and a slit 30 extending upwardly in the rear direction is formed in each of these protruding pieces 24 and 26. Both end portions of an axis 34 provided with a roll of tape 32 are rotatably mounted in these slits 30. The tape 32 can be made of any suitable material well know among those skilled in the art.

Figure 2:
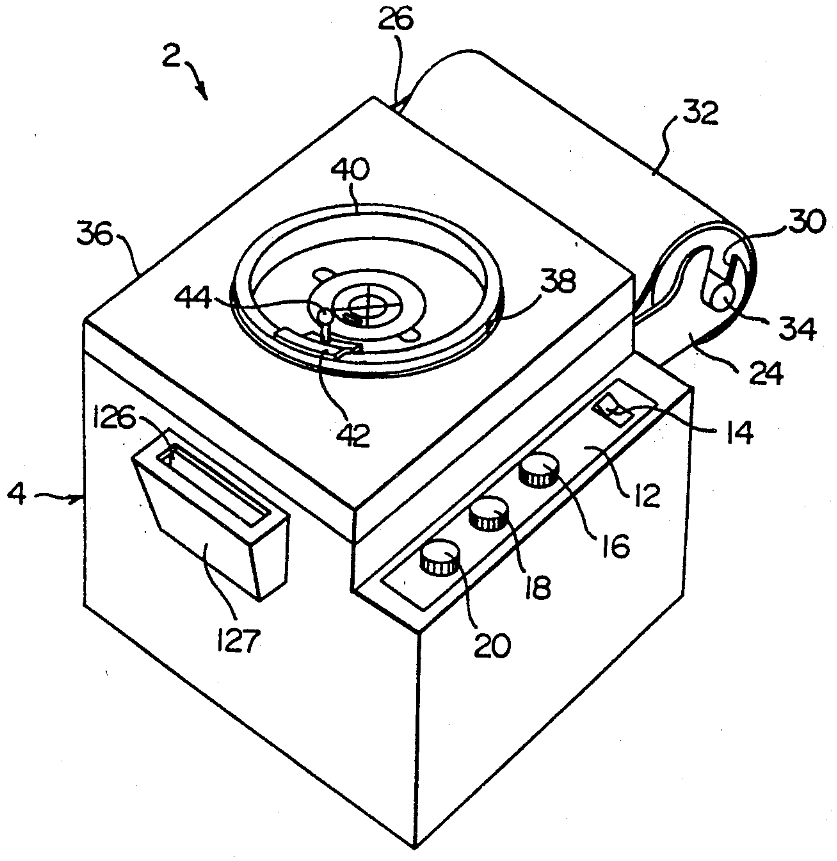
FIG. 2 is a perspective view showing the wafer mounting machine of FIG. 1 in the state that its movable frame is in a closed position.

With reference to FIG. 2 as well as FIG. 1, on the aforesaid housing 4, there is provided a movable frame 36 freely movable between an open position shown in FIG. 1 and a closed position shown in FIG. 2. A relatively large opening 38 which may be circular is formed in the central portion of this movable frame 36. An annular member 40 is rotatably provided in this opening 38 with a suitable supporting means (not shown). A mounting bracket 42 is fixed to this annular member 40. A manual operation handle 44 (FIG. 2) is fixed and a disc-like cutter 46 (FIG. 3) is rotatably provided to this mounting bracket 42. Moreover, as shown in FIG. 1, an annular projection 48 concentric with the aforesaid opening 38 is formed on the inner surface of the movable frame 36.

In the meantime, since the aforesaid constructions except for the article holding apparatus 10 in the wafer mounting machine 2 is already known, a detailed explanation about them is omitted.

Figure 3:
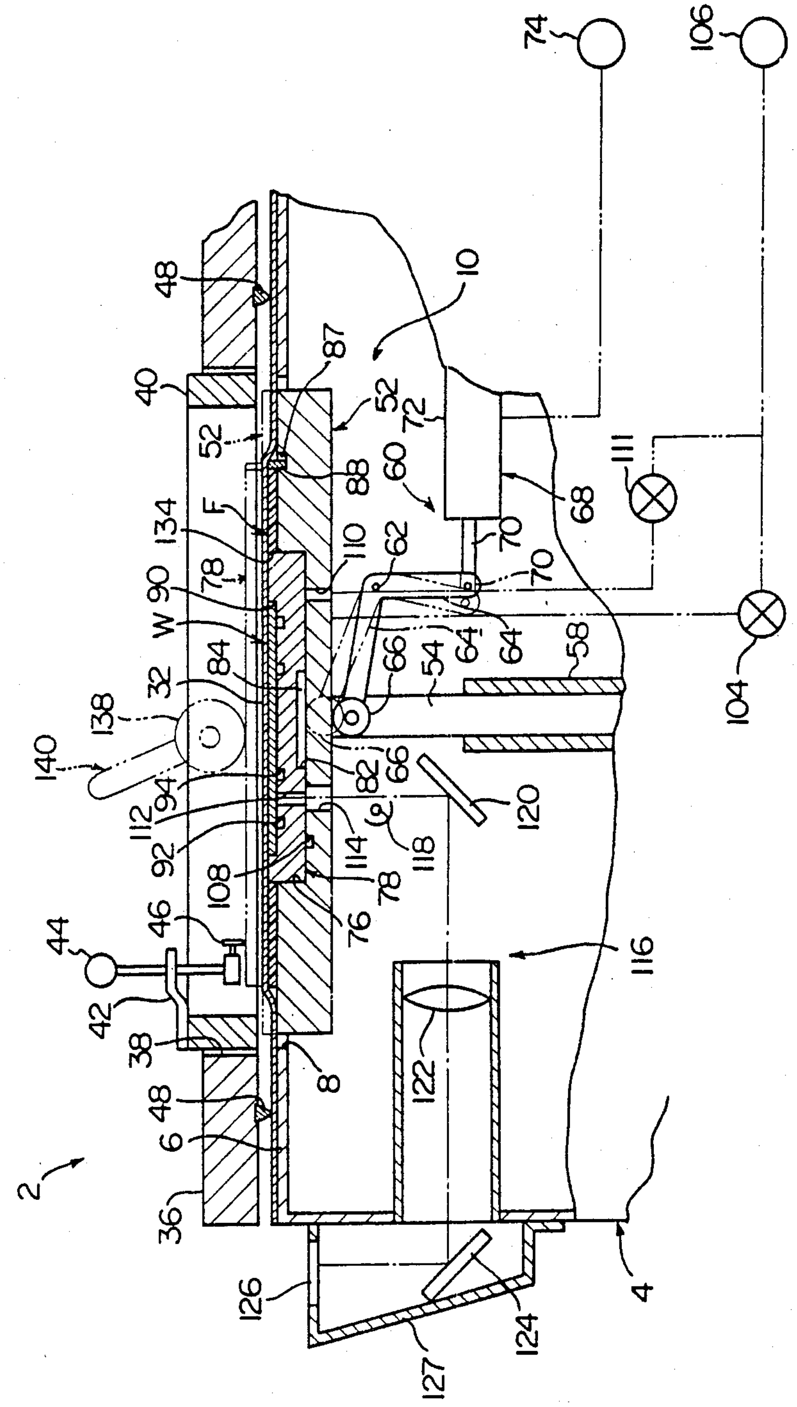
FIG. 3 is a side view showing the main part of the wafer mounting machine of FIG. 1 partly with its section.

With reference to FIG. 3, the illustrated article holding apparatus 10 includes a disc-shaped supporting table 52. To this supporting table 52, two supports 54 (only one of them is shown in FIG. 3) extending substantially perpendicularly downwardly from the undersurface thereof are fixed. On the other hand, to the bottom wall of the aforesaid housing 4, two guide cylinders 58 (only one of them is shown in FIG. 3) extending substantially perpendicularly are fixed. The two supports 54 are slidably inserted in the two guide cylinders 58, and thus the supporting table 52 is mounted to be movable up and down substantially in the perpendicular direction. An up-and-down means 60 to move the supporting table 52 up and down is provided in the housing 4. This up-and-down means 60 has a L-shaped lever 64 revolvably set with a pin 62. A roller 66 which is made to come in contact with the undersurface of the supporting table 52 is rotatably provided at one end of the lever 64. The edge of a rod 70 of a singleacting fluid pressure cylinder mechanism 68 is revolvably connected to the other end of the lever 64. A cylinder 72 of the fluid pressure cylinder mechanism 68 is fixed at a certain position in the housing 4 with a suitable supporting bracket (not shown). When the up-and-down switch 20 (FIG. 1) is closed by manual operation, pressurized fluid is supplied from a pressurized fluid source 74 disposed outside the housing 4 to the cylinder mechanism 68, and thus the rod 70 is extended up to a position shown with a two-dot chain line. The lever 64 is thereby revolved up to a position shown with a two-dot chain line and the supporting table 52 is thereby made to go up to a position shown with a two-dot chain line. When the up-and-down switch 20 (FIG. 1) is opened by manual operation, the cylinder mechanism 68 is shut off from the pressurized fluid source 74 and the fluid pressure is released. Accordingly, the supporting table 52 goes down by its own weight to a position shown with a solid line, the lever 64 is returned to a position shown with a solid line, and the rod 70 of the cylinder mechanism 68 is returned to a contraction position shown with a solid line.

Figure 4:
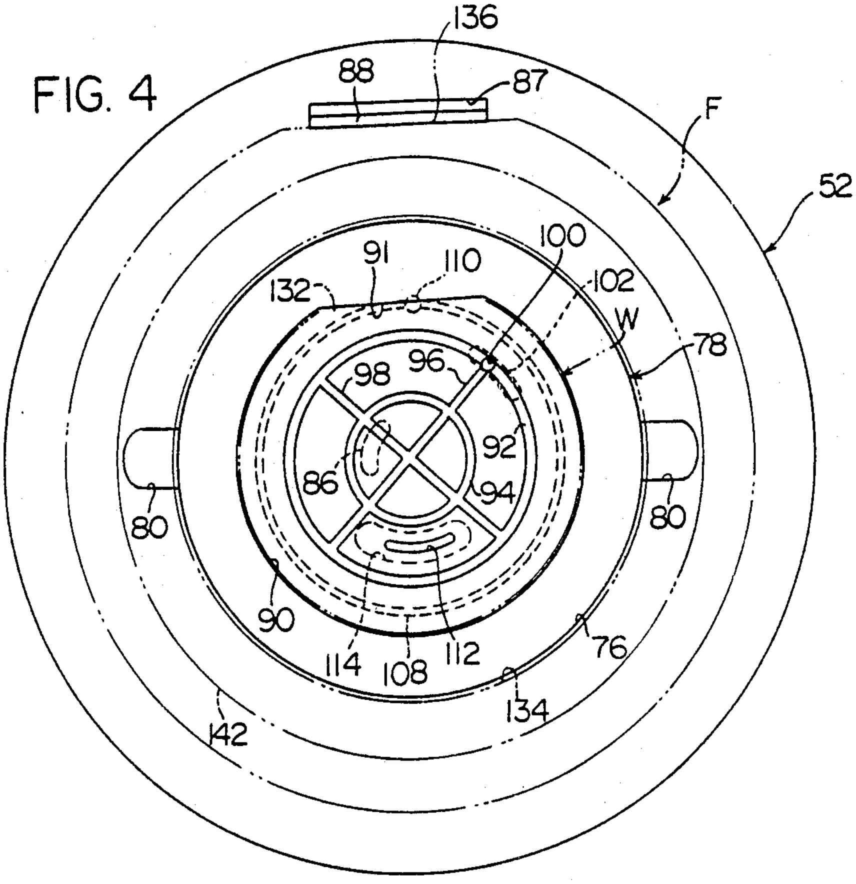
FIG. 4 is a top plan view showing a supporting table and a plate in the article holding apparatus provided to the wafer mounting machine of FIG. 1.

With reference to FIG. 4 as well as FIG. 3, a circular depression 76 is formed in the upper surface central portion of the aforesaid supporting table 52. And a disc-like plate 78 is rotatably received in this circular depression 76. As clearly shown in FIG. 3, the thickness of the plate 78 is a little bigger than the depth of the circular depression 76. Accordingly, the upper surface of the plate 78 protrudes upwardly a little beyond the upper surface of the supporting table 52. As described later, cavities 80 (FIG. 4) extending radially outwardly from the circular depression 76 at two positions diametrically facing with each other are also formed on the upper surface of the supporting table 52 in order to make it possible to easily put fingers to the plate 78 when manually rotating the plate 78. As shown in FIG. 3, a circular depression 82 is formed on the undersurface of the plate 78 and a disclike electric heater 84 is fixed in this circular depression 82. This electric heater 84 is connected to a power source (not shown) with lead lines (not shown) extending through a vertical through opening 86 (FIG. 4) formed in the supporting table 52. The opening 86 has an enough size to the lead lines not to prevent rotation of the plate 78 against the supporting table 52 ranging a required angle range, about 10° for example. A rectangular depression 87 is also formed at a certain position on the upper surface of the supporting table 52. And a flat spring 88 is provided in the depression 87. The flat spring 88 protrudes upwardly beyond the upper surface of the supporting table 52.

As described later, a semiconductor wafer W is placed on the aforesaid plate 78. A wafer receiving depression 90 of a shape (in the illustrated embodiment, it is circular except for a flat portion 91 existing at the rear end portion) corresponding to the shape of the wafer W is formed on the upper surface of the plate 78. The depth of this wafer receiving depression 90 may be substantially equal or a little smaller than the thickness of the wafer W placed therein. In order to selectively attract under vacuum the wafer W placed on the upper surface of the plate 78, the following suction passage is formed in the plate 78 and the supporting table 52. Concentric two annular grooves 92 and 94, and two diameterical grooves 96 and 98 connecting these annular grooves 92 and 94 are formed on the bottom surface of the wafer receiving depression 90 formed on the upper surface of the plate 78. A vertical through suction hole 100 is also formed in the plate 78 at one of the intersecting points of the annular groove 92 and the diameterical groove 96. A vertical through suction hole 102 is formed in the supporting table 52 corresponding to this suction hole 100. This suction hole 102 extends long like an arc to maintain mutual communication between the suction hole 100 and the suction hole 102 even if the plate 78 is made to rotate against the supporting table 52 ranging a required angle range, about 10° for example. The suction hole 102 is connected to a vacuum source 106 disposed outside the housing 4 through a communicating means having a control valve 104 which can be constructed of a suitable pipeline (FIG. 3). As shown in FIG. 4 with a two dot chain line, when the wafer W is placed in the wafer receiving depression 90 of the plate 78, the grooves 92, 94, 96 and 98 are covered with the wafer W. Thereafter, when the first vacuum switch 16 (FIG. 1) is closed by manual operation, the control valve 104 is made to be in a communicating state to communicate the suction holes 102 and 100 as well as the grooves 92, 94, 96 and 98 with the vacuum source 106, and thus the wafer W is attracted under vacuum to the plate 78. When the first vacuum switch 16 (FIG. 1) is opened, the control valve 104 is made to be in an open state and the suction holes 102 and 100 as well as the grooves 92, 94, 96 and 98 are shut off from the vacuum source 106 and released to the atmosphere. The wafer W is thus released from the attraction under vacuum.

As described above, the plate 78 is rotatably received in the circular depression 76 of the supporting table 52, but in the illustrated embodiment, the following suction passage is formed in the supporting table 52 in order to selectively restrict rotation of the plate 78 against the supporting table 52. An annular groove 108 is formed on the bottom surface of the circular depression 76 formed in the supporting table 52. A through suction hole 110 extending downwardly from the annular groove 108 is also formed in the supporting table 52. As shown in FIG. 3, this suction hole 110 is connected to the aforesaid vacuum source 106 through a communicating means which can be constructed of a suitable pipeline having a control valve 111. As is understood from FIG. 3 and FIG. 4, the annular groove 108 is covered with the plate 78. When the second vacuum switch 18 (FIG. 1) is closed by manual operation, the control valve 111 is made to be in a communicating state to communicate the suction hole 110 and the groove 108 with the vacuum source 106. The plate 78 is thus attracted under vacuum to the supporting table 52 and rotation of the plate 78 against the supporting table 52 is restricted. When the second vacuum switch 18 (FIG. 1) is opened, the control valve 111 is made to be in an open state, and the suction hole 110 and the groove 108 are shut off from the vacuum source 106 and released to the atomosphere. The attraction under vacuum of the plate 78 is thus released and rotation of the plate 78 against the supporting table 52 is allowed.

With reference to FIG. 3 and FIG. 4, in the article holding apparatus 10 constructed in accordance with this invention, a vertical through light transmitting opening 112 is formed in the region of the plate 78 where an article, i.e. the wafer W is placed, that is, in the region of the wafer receiving depression 90. A vertical through light transmitting opening 114 is also formed in the supporting table 52 corresponding to this light transmitting opening 112. Accordingly, a part of the undersurface of the wafer W placed in the wafer receiving depression 90 of the plate 78 is exposed downwardly through the light transmitting openings 112 and 114. As shown in FIG. 4, the light transmitting opening 114 formed in the supporting table 52 is extending, like an arc, long as compared with the light transmitting opening 112 formed in the plate 78. Accordingly, even if the plate 78 is made to rotate against the supporting table 52 ranging a required angle range which may be about 10° for example, it does not happen that the light transmitting opening 112 slides off from the light transmitting opening 114 and that the exposure of the part of the undersurface of the wafer W through the light transmitting openings 112 and 114 is prevented.

Figure 5:
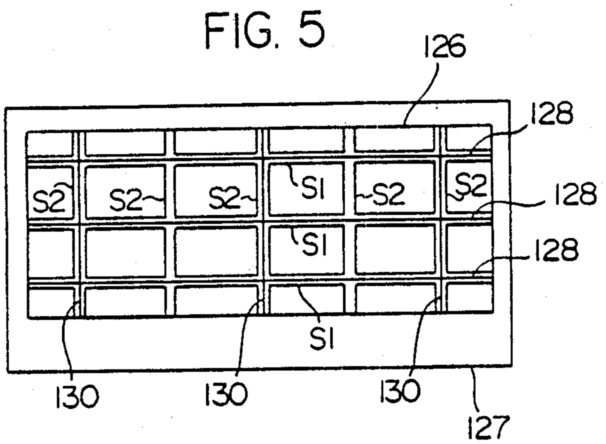
FIG. 5 is a top plan view showing an image formation screen of an optical system in the article holding apparatus provided to the wafer mounting machine of FIG. 1.

With reference to FIG. 3, there is provided an optical system shown generally at 116 in connection with the light transmitting openings 112 and 114. The optical system 116 in the illustrated embodiment includes a lighting lamp 118, a first reflecting mirror 120, a magnifying lens 122, a second reflecting mirror 124 and an image formation screen 126. The image formation screen 126 which may be a translucent glass is disposed at the upper end of a protrusion 127 formed at the transversal central portion of the front wall of the aforesaid housing 4 and an operator can directly look at the image formation screen 126 from the outside of the housing 4 (refer to FIG. 1 as well). The lighting lamp 118 disposed under the light transmitting opening 114 lights the part of the undersurface of the wafer W through the light transmittting opening 114 and the light transmitting opening 112. Reflection light from the part of the undersurface of the wafer W reaches, through the light transmitting opening 112 and the light transmitting opening 114, the first reflecting mirror 120 disposed under the openings 112 and 114, reaches the second reflecting mirror 124 through the magnifying lens 122 and reaches the image formation screen 126. In this way, the image of the part of the undersurface of the wafer W is magnified and formed on the image formation screen 126, and an operator can look at this image from the outside of the housing 4. As shown in FIG. 5, it is preferable that at least one standard line, in the illustrated embodiment three standard lines 128 extending laterally in parallel to one another and three standard lines 130 extending longitudinally in parallel to one another are provided on the image fromation screen 126. If desired, the standard lines 128 and 130 may be provided on the first or second reflecting mirror 120 or 122 instead of providing the standard lines 128 and 130 on the image formation screen 126.

In the next place, an outline of one example of a wafer mounting operation procedure making use of the aforesaid wafer mounting machine 2 will be given. First of all, the power switch 14 (FIG. 1) is closed by manual operation. Then, the lighting lamp 118 (FIG. 3) of the optical system 116 is energized and the electric heater 84 (FIG. 3) disposed at the undersurface of the plate 78 is also energized. Next, the movable frame 36 is positioned in the open position shown in FIG. 1. Then, a wafer W is placed in the wafer receiving depression 90 of the plate 78. On this occasion, as shown in FIG. 4, the orientation flat 132 of the wafer W is brought line with the flat portion 91 of the wafer receiving depression 90. And, the wafer W is placed in the wafer receiving depression 90 such that the surface of the wafer W on which a circuit pattern is applied and so-called streets S1 and S2 (FIG. 5) arranged in a lattice pattern exist becomes the undersurface (i.e. faces with the plate 78). Subsequently, the first vacuum switch 16 (FIG. 1) is closed and thus the wafer W is attracted under vacuum to the plate 78. Next, while looking at the image formation screen 126 of the optical system 116, the plate 78 is rotated by putting fingers to the plate 78 at the cavities 80 formed in the supporting table 52 and thus, as shown in FIG. 5, the lateral streets S1 in the image of the part of the undersurface of the wafer W formed on the image formation screen 126 are made to be fully precisely parallel to the lateral standard lines 128 formed on the image formation screen 126. (Thereby, the longitudinal streets S2 in the image of the part of the undersurface of the wafer W are necessarily made to be fully precisely parallel to the longitudinal standard lines 130 formed on the image formation screen 126.) Next, the second vacuum switch 18 (FIG. 1) is closed and the plate 78 is attracted under vacuum to the supporting table 52 to restrict rotation of the plate 78. Then, as shown with solid lines in FIG. 3 and with two-dot chain lines in FIG. 4, a frame F is placed on the supporting table 52. The illustrated frame F is roughly annular and the inner diameter of a circular opening 134 existing in the central portion thereof is substantially equal to the outer diameter of the plate 78. A flat portion 136 is formed at a part of the outer periphery of the frame F. Such a frame F is placed on the supporting table 52 so that the plate 78 is positioned in the circular opening 134 thereof, and the flat portion 136 is made contact with the inner surface of the flat spring 88. In this manner, the frame F is springily held in an angular position shown in FIG. 4 by a spring action of the flat spring 88. In this state, the flat portion 136 of the frame F and the streets S1 (FIG. 5) on the undersurface of the wafer W are fully precisely parallel to each other. As is understood from FIG. 3, the thickness of the frame F is substantially equal or a little larger than the protruding height of the plate 78 from the upper surface of the supporting table 52. Hence, the upper surface of the frame F, the upper surface of the plate 78 and the upper surface of the wafer W are on substantially or roughly the same plane. Next, the tape 32 is pulled out by holding the end of the tape 32 led out on the upper surface of the housing 4 through a gap existing between the upper surface of the housing 4 and the movable frame 36 as shown in FIG. 1 and the upper surface of the housing 4 is covered with the tape 32. Thereafter, the movable frame 36 is put in the closed position shown in FIG. 2 and locked in the closed position with a locking mechanism not shown. Thereby, as clearly shown in FIG. 3, the annular projection 48 formed on the inner surface of the movable frame 36 is pushed to the upper wall 6 of the housing 4 through the tape 32 and thus the tape 32 is clamped with the upper wall 6 of the housing 4 and the annular projection 48. Then, the up-and-down switch 20 (FIG. 1) is closed, and the supporting table 52 and the plate 78 as well as the wafer W and the frame F placed thereon are gone up to a position shown with a two-dot chain line in FIG. 3. Thereby, as is easily understood, the tape 32 is stretched in the annular projection 48. Moreover, as clearly shown in FIG. 3, the upper surface of the frame F is made contact, through the tape 32, with the cutter 46 provided to the annular member 40 provided to the movable frame 36. Heat is conducted from the electric heater 84 to the tape 32 through the plate 78 and the wafer W, and the tape 32 is heated to a required temperature. Thereafter, the tape 32 is pushed to the upper surface of the wafer W and the upper surface of the frame F using a pusher 140 (FIG. 3) having an elastic roller 138 rotatably provided thereto, and thus the tape 32 is sticked to the upper surface of the wafer W and the upper surface of the frame F. Subsequently, the annular member 40 provided to the movable frame 36 is rotated once by holding the handle 44. As a result, the tape 32 is cut along a two-dot chain line 142 in FIG. 4 by an action of the cutter 46 provided to the annular member 40. Thereafter, the movable frame 36 is positioned to the open position shown in FIG. 1. Subsequently, the tape 32 is cut with a suitable knife along the slit 22 (FIG. 1) formed in the upper wall 6 of the housing 4. Next, the first vacuum switch 16 (FIG. 1) is opened to release the attraction under vacuum of the wafer W to the plate 78. Thereafter, the frame F and the wafer W mounted to the frame F through the circular part of the tape 32 in the two-dot chain line 142 in FIG. 4 are taken out, and the disused part of the tape 32 outside the two-dot chain line 142 in FIG. 4 and before the slit 22 (FIG. 1) is also taken out. Next, the second vacuum switch 18 (FIG. 1) is opened to release the attraction under vacuum of the plate 78 to the supporting table 52 and the up-and-down switch 20 (FIG. 1) is also opened to cause the supporting table 52 and the plate 78 to go down to a position shown with solid lines in FIG. 3.

While one example of the wafer mounting machine provided with one specific embodiment of the article holding apparatus constructed in accordance with this invention has been described in detail hereinabove with reference to the accompanying drawings, it should be understood that the invention is not limited to them alone, various changes and modifications are possible without departing from the scope of this invention.

For example, instead of the magnifying lens 122 and the image formation screen 126 of the optical system 116 in the illustrated embodiment, a microscope which may be of low power can be disposed on the second reflecting mirror 124 to see the part of the undersurface of the wafer W through such a microscope.

Although there has been explained about the article holding apparatus 10 applied to the manual wafer mounting machine 2 in which placing and taking out of the wafer W and the frame F, handling of the tape 32 and the like are manually carried out, the article holding apparatus of this invention can be also applied to an automatic wafer mounting machine in which placing and taking out of a wafer and a frame, handling of tape and the like can be automatically carried out. Particularly in this case, it is preferable to provide a camera means (which can be constructed of a large number of CCDs for example) for taking a part of the image of the undersurface of the wafer, an analysis means (which can be constructed of a microprocessor, etc.) for analyzing the image taken by this camera means, etc. and to automatically adjust rotation angle position of the wafer placed on a plate.

Furthermore, although the rotation angle position of the wafer W is adjusted by rotating the plate 78 in the aforesaid embodiment, it is possible, if desired, to adjust rotation angle position of the frame F instead of the plate 78 and the wafer W placed thereon while looking at the angle of the streets S1 and S2 of the wafer W on the image formation screen 126.

What is claimed is:

1. A combination of a semiconductor wafer and a device for mounting the wafer to a frame comprising
   - a semiconductor wafer consisting essentially of a first surface having streets arranged in a lattice pattern and a second surface;
   - a plate for holding the wafer, wherein the plate has a light transmitting opening therethrough, and the wafer is positioned on the plate so that the second surface is uncovered and the streets on the first surface face the light transmitting opening;
   - an optical system optically connected to the light transmitting opening so that light can be reflected from a part of the first surface through the light transmitting opening and into the optical system, and the part of the surface forms an image that can be viewed through the optical system;
   - a frame to which the second surface of the wafer can be secured;
   - means for rotationally aligning the wafer relative to the frame based on the image in the optical system; and
   - means for covering the second surface of the wafer with tape opposite the streets on the first surface and for securing the wafer in aligned relationship to the frame.

2. Combination according to claim 1, wherein said optical system includes a lamp to light the part of the first surface of the wafer placed on said plate through said light transmitting opening.

3. Combination according to claim 1, wherein said optical system includes a reflecting mirror disposed under said light transmitting opening.

4. Combination according to claim 1, wherein said optical system includes a magnifying lens.

5. Combination according to claim 1, wherein said optical system includes an image formation screen.

6. combination according to claim 1, wherein at least one standard line is formed on one of the elements of said optical system.

7. Combination according to claim 1, wherein a suction hole is formed in said plate, communicating means is provided to cause said suction hole to communicate selectively with a vacuum source, and the article placed on said plate is attracted under vacuum to said plate when said communicating means causes said suction hole to communicate with said vacuum source.

8. Combination according to claim 1, wherein a supporting table is provided, said plate is mounted on said supporting table, a light transmitting opening is also formed in said supporting table, and reflection light from the part of the first surface of the wafer placed on said plate comes into said optical system through said light transmitting opening formed in said plate and said light transmitting opening formed in said supporting table.

9. Combination according to claim 8, wherein said plate is rotatably mounted on said supporting table, and restricting means is provided to releasably restrict rotation of said plate against said supporting table.

10. Combination according to claim 9, wherein said restricting means includes a suction hole fomed in said supporting table and communicating means to cause said suction hole to communicate selectively with a vacuum source, said plate is attracted under vacuum to said supporting table when said communicating means causes said suction hole to communicate with said vacuum source, and thus the rotation of said plate against said supporting table is restricted.

11. A combination of a semiconductor wafer and a device for mounting the wafer to a frame comprising a semiconductor wafer consisting essentially of a first surface having streets arranged in a lattice pattern and a second surface;

a plate for holding the wafer, wherein the plate has a light transmitting opening therethrough, and the wafer is positioned on the plate so that the second surface is uncovered and the streets on the first surface face the light transmitting opening;

an optical system optically connected to the light transmitting opening so that light can be reflected from a part of the first surface through the light transmitting opening and into the optical system, and the part of the surface forms an image that can be viewed through the optical system, wherein the optical system comprises the following elements (i) a lamp to light the part of the first surface of the wafer placed on the plate through the light transmitting opening;

(ii) an image formation screen for viewing the image on the part of the first surface;

(iii) a reflecting mirror disposed under the light transmitting opening for transmitting the image on the part of the first surface to the image formation screen; and (iv) at least one standard line on one of the elements of the optical system;

a frame to which the second surface of the wafer can be secured; to means for rotationally aligning the wafer relative the frame so that the image in the image formation screen is aligned with the standard line in the optical system; and means for covering the second surface of the wafer with tape opposite the streets on the first surface and for securing the wafer in aligned relationship to the frame.

12. Combination according to claim 11, wherein said optical system includes a magnifying lens.

13. Combination according to claim 12, wherein a suction hole is formed in said plate, communicating means is provided to cause said suction hole to communicate selectively with a vacuum source, and the article placed on said plate is attracted under vacuum to said plate when said communicating means causes said suction hole to communicate with said vacuum source.

14. Combination according to claim 13, wherein a supporting table is provided, said plate is mounted on said supporting table, a light transmitting opening is also formed in said supporting table, and reflection light from the part of the first surface of the wafer placed on said plate comes into said optical system through said light transmitting opening formed in said plate and said light transmitting opening formed in said supporting table.

15. Combination according to claim 14, wherein said plate is rotatably mounted on said supporting table, and restricting means is provided to releasably restrict rotation of said plate against said supporting table.

16. Combination according to claim 15, wherein said restricting means includes a suction hole formed in said supporting table and communicating means to cause said suction hole to communicate selectively with a vacumm source, said plate is attracted under vacuum to said supporting table when said communicating means causes said suction hole to communicate with said vacuum source, and thus the rotation of said plate against said supporting table is restricted.

17. A method of mounting a semiconductor wafer in a frame of a wafer holding device, said method comprising providing a semiconductor wafer consisting essentially of a first surface having streets arranged in a lattice pattern and a second surface;

Providing a plate for holding the wafer, wherein the plate has a light transmitting opening therethrough;

Positioning the wafer on the plate so that the second surface is uncovered and the streets on the first surface face the light transmitting opening;

providing an optical system optically connected to the light transmitting opening so that light can be reflected from a part of the first surface through the light transmitting opening and into the optical system, and the part of the surface forms an image that can be viewed through the optical system;

providing a frame to which the second surface of the wafer can be secured;

viewing the image in the optical system while rotationally aligning the wafer relative to the frame based on the image; and covering the second surface of the wafer with tape opposite the streets on the first surface for securing the wafer in aligned relationship to the frame.

18. Method according to claim 17, wherein the optical system includes an image formation screen and an element having at least one standard line thereon, and the method further comprises viewing the image on the part of the first surface in the image formation screen, and aligning the image with the standard line by rotating the wafer relative to the frame.

19. Method according to claim 18, which comprises providing a suction hole in said plate and communicating means between the suction hole and a vacuum source, wherein the method further comprises applying a vacuum through said communicating means to said plate to attract the wafer to the plate under vacuum.

* * * * *